(12) United States Patent
Richardson

(10) Patent No.: US 7,907,684 B2
(45) Date of Patent: Mar. 15, 2011

(54) SIGNAL REGENERATION

(75) Inventor: Michael Richard Richardson, Romsey (GB)

(73) Assignee: BAE Systems PLC, London (GB)

(*) Notice: Subject to any disclaimer, the term of this patent is extended or adjusted under 35 U.S.C. 154(b) by 719 days.

(21) Appl. No.: 10/522,757

(22) PCT Filed: Nov. 19, 2004

(86) PCT No.: PCT/GB2004/004910
§ 371 (c)(1),
(2), (4) Date: Jan. 28, 2005

(87) PCT Pub. No.: WO2005/053174
PCT Pub. Date: Jun. 9, 2005

(65) Prior Publication Data
US 2006/0165158 A1 Jul. 27, 2006

(30) Foreign Application Priority Data
Nov. 21, 2003 (GB) .................................. 0327041.0

(51) Int. Cl.
*H03D 3/22* (2006.01)
(52) U.S. Cl. ......... 375/329; 375/325; 375/214; 375/322
(58) Field of Classification Search .................. 375/329, 375/214, 322, 316; 329/315, 345
See application file for complete search history.

(56) References Cited

U.S. PATENT DOCUMENTS

| 4,525,676 A * | 6/1985 | Atobe et al. ................. 329/307 |
| 4,947,409 A * | 8/1990 | Raith et al. ...................... 375/97 |
| 5,276,706 A * | 1/1994 | Critchlow ..................... 375/343 |
| 5,440,265 A | 8/1995 | Cochran et al. |
| 5,490,173 A * | 2/1996 | Whikehart et al. ........... 375/316 |
| 5,583,870 A | 12/1996 | Delprat et al. |
| 5,852,629 A | 12/1998 | Iwamatsu |
| 5,974,087 A | 10/1999 | Nowara |
| 6,301,470 B1 * | 10/2001 | Brunner et al. ................ 455/278 |
| 6,859,491 B1 * | 2/2005 | Zhou .............................. 375/231 |
| 6,885,693 B1 * | 4/2005 | Burton .......................... 375/142 |
| 7,035,337 B2 * | 4/2006 | Sugiyama et al. ........ 375/240.27 |
| 2001/0005406 A1 * | 6/2001 | Mege et al. .................... 375/354 |
| 2003/0020653 A1 | 1/2003 | Baugh et al. |
| 2005/0147188 A1 * | 7/2005 | Liu ................................ 375/326 |
| 2008/0025266 A1 * | 1/2008 | Tynderfeldt et al. .......... 370/337 |

FOREIGN PATENT DOCUMENTS

EP 0 893 703 A1 1/1998

(Continued)

*Primary Examiner* — Shuwang Liu
*Assistant Examiner* — Helene Tayong
(74) *Attorney, Agent, or Firm* — Scully, Scott, Murphy & Presser, P.C.

(57) ABSTRACT

Described herein is a method for signal regeneration, particularly, of the signal type transmitted by cellular base stations used in cellular telephone network systems. It is sometimes necessary to regenerate an accurate replica of a transmitted signal, by removing any errors that are present and/or compensate for any degradation that occur during transmission. The signal structure of signals transmitted within the cellular network systems is of a known form with predefined characteristics such as synchronization signals, error correction bursts or training sequences. The method includes determining frame timing of the received signal, identifying the locations of sequences within the signal from the frame timing, identifying the structure of the sequences, estimating phase shift values at the locations of the sequences, demodulating the symbol stream using the estimated phase shift values and the structure of the sequences, correcting symbol errors by various techniques and remodulating the symbol stream using the phase shift values to regenerate the signal that is substantially identical to the one that would have been received directly from the transmitter over a high quality land-line.

19 Claims, 4 Drawing Sheets

FOREIGN PATENT DOCUMENTS

| | | |
|---|---|---|
| EP | 1 501 215 A1 | 1/2005 |
| GB | 2 291 300 A | 1/1996 |
| GB | 2 311 697 A | 10/1997 |
| JP | 52-136527 | 11/1977 |
| WO | WO 01/28272 A1 | 4/2001 |
| WO | WO 03/094417 A1 | 11/2003 |

* cited by examiner

Fig.3.

| Count | Offset | Flags | TS | Phase | Demodulated phase |
|---|---|---|---|---|---|
| 293 | 45913 | FCB | 8 | 356.1 | 276 |
| 294 | 46070 | 18 | 8 | 240.5 | 280.7 |
| 295 | 46226 | 16 | 8 | 208.4 | 278.6 |
| 296 | 46382 | 16 | 8 | 180 | 280.2 |
| 297 | 46538 | 17 | 8 | 148.7 | 278.9 |
| 298 | 46695 | 18 | 8 | 30.3 | 280.6 |
| 299 | 46851 | 16 | 8 | 2.6 | 282.9 |
| 300 | 47007 | 16 | 8 | 329.4 | 279.8 |
| 301 | 47163 | SYNC | 8 | 296.7 | 279.8 |
| 302 | 47320 | 18 | 8 | 177.3 | 277.9 |
| 303 | 47476 | 16 | 8 | 149.1 | 279.7 |
| 304 | 47632 | 16 | 8 | 118.1 | 278.6 |
| 305 | 47788 | 17 | 8 | 84.9 | 275.5 |
| 306 | 47945 | 18 | 8 | 327.4 | 278.2 |
| 307 | 48101 | 16 | 8 | 298.2 | 278.9 |
| 308 | 48257 | 16 | 8 | 264.9 | 275.7 |
| 309 | 48413 | 17 | 7 | 55.4 | 276.3 |
| 310 | 48570 | 18 | 8 | 115.5 | 276.4 |
| 311 | 48726 | 16 | 8 | 85.3 | 276.3 |
| 312 | 48882 | 16 | 8 | 55.3 | 276.2 |
| 313 | 49038 | 17 | 7 | 208.2 | 279.3 |
| 314 | 49195 | 18 | 7 | 84.8 | 276 |
| 315 | 49351 | 16 | 8 | 236 | 277.2 |
| 316 | 49507 | 16 | 8 | 209.4 | 280.6 |
| 317 | 49663 | 17 | 7 | 356.8 | 278.1 |
| 318 | 49820 | 18 | 8 | 54.7 | 276 |
| 319 | 49976 | 16 | 8 | 22.7 | 274.1 |
| 320 | 50132 | 16 | 8 | 351.4 | 272.8 |
| 321 | 50288 | 17 | 8 | 323.9 | 275.2 |
| 322 | 50445 | 18 | 8 | 203.2 | 274.7 |
| 323 | 50601 | 16 | 8 | 176.3 | 277.9 |
| 324 | 50757 | 16 | 8 | 142 | 273.5 |
| 325 | 50913 | 17 | 7 | 294.4 | 276 |
| 326 | 51070 | 18 | 8 | 353 | 274.8 |
| 327 | 51226 | 16 | 8 | 321.3 | 273.1 |
| 328 | 51382 | 16 | 8 | 290.8 | 272.5 |
| 329 | 51538 | 17 | 8 | 264.1 | 275.8 |
| 330 | 51695 | 18 | 8 | 145.3 | 277.3 |
| 331 | 51851 | 16 | 8 | 111.7 | 273.7 |
| 332 | 52007 | 16 | 8 | 82.4 | 274.4 |
| 333 | 52163 | 17 | 7 | 231.7 | 273.7 |
| 334 | 52320 | 18 | 8 | 293.1 | 275.2 |
| 335 | 52476 | 16 | 8 | 264.4 | 276.6 |
| 336 | 52632 | 16 | 8 | 230.7 | 272.9 |
| 337 | 52788 | 17 | 7 | 22.7 | 274.9 |
| 338 | 52945 | 18 | 7 | 262.4 | 274.8 |
| 339 | 53101 | 16 | 8 | 51.1 | 273.5 |
| 340 | 53257 | 16 | 8 | 21.1 | 273.5 |
| 341 | 53413 | 17 | 7 | 170.7 | 273.2 |
| 342 | 53570 | 18 | 8 | 229.2 | 271.8 |
| 343 | 53726 | 16 | 8 | 198.9 | 271.5 |
| 344 | 53882 | 16 | 8 | 171.2 | 273.7 |
| 345 | 54038 | 17 | 8 | 140.4 | 273 |
| 346 | 54195 | 18 | 8 | 20.8 | 273.6 |
| 347 | 54351 | 16 | 8 | 351.3 | 274.1 |
| 348 | 54507 | 16 | 8 | 318.7 | 271.5 |

SIGNAL REGENERATION

The present invention relates to signal regeneration. More specifically, the invention relates to the regeneration a transmitted signal, particularly, but not exclusively, of the signal type transmitted by cellular base stations, said signals being used in mobile, or cellular, telephone network systems.

Mobile telephone systems usually comprise a network of base stations. Signals are transmitted to/from mobile handsets of a user (subscriber) in order to provide telephone and other services.

The operational range of base stations, in the aforementioned mobile or cellular telephone network systems, is typically 10 to 20 kilometers (km).

Typically such signals transmitted by base stations are of the order of a few tens or even hundreds of Watts. The frequency of the signals is usually in the low microwave region of the electromagnetic spectrum, typically around the 1 GHz to 2 GHz range. This range of frequencies is found in GSM mobile telephone networks. However, it will be appreciated that the operational range of frequencies may be different in other signal transmission/broadcasting systems.

Other systems to which this technique may be applied include: for example, digital audio broadcasting (DAB) systems, coded division multiple access (CDMA), Quadrature Phased Shift Keying (QPSK) communication systems, High Performance Radio Local Area Networks (HIPERLAN); and Universal Mobile Telecommunication Systems (UMTS) telephone networks.

It is important that the structure of transmitted signals within the aforementioned and other systems is such that the signal structure has known, predefined characteristics and contains synchronisation sequences or bursts, training sequences etc.

Such sequences are often generated from pseudo-random codes, which have a good auto correlation functions. Correlation techniques are therefore widely used in GSM and similar communications systems to perform signal synchronisation, detection and other signal processing tasks.

In order to regenerate an accurate replica of a transmitted signal in a receiver, it is necessary to remove any errors that are present and/or compensate for any degradation that occur during transmission. Errors and signal degradation occur during transmission of any signals, and may arise as a result of: signal attenuation and fading; multi-path reflection/multipath dispersion; background noise; interference by other signals; or a combination of these and other effects. All the effects, to varying degrees, reduce the efficiency and performance of systems that use transmitted signals.

A common theme of many systems that utilise signals, for example to locate a mobile user, is that an accurate indication or replica of the transmitted signal is needed.

There are certain techniques that can help to correct or modify a received signal so that certain types of errors could be corrected or compensated. However, in the past, such regenerated signals often had residual errors.

WO-A-01/28272 describes a system for determining the position of a base station within a cellular transmission network. Field strengths from adjacent base stations are measured and information relating to these is used to provide a fix on a mobile transmitter within the cell of the network. The position is based upon identifying signal strengths and by performing a best-fit match to data when overlaid on a geographical map. No attempt is made to reconstruct or regenerate a signal.

It is generally an aim to reduce all forms of signal degradation and noise. GB-A-2 291 300 describes a method of determining whether a vehicle is travelling on a predetermined path by comparing signal strength from a base station of a mobile telecommunication system over a period of time normalising the signal and comparing this with stored signal strength versus distance information. Again, as part of the determination process an indication of the transmitted signal is desirable. However, no attempt is made at deriving such a signal.

Another technique of improving signal quality or reducing noise is to orient an antenna at signal source and phase lock the antenna to the frequency of the signal. However, this is not always practicable, particularly where there is restricted line of sight and/or where signal reflections occur.

GB-A-2 311 697 discloses a technique for estimating the position of a mobile station in a wireless communication system using signal strengths from a plurality of base stations. These signal strengths are correlated with measurements previously obtained at a plurality of known positions. The resultant data is used to correct the received signals to provide an indication of the position of a mobile station.

It is an object of the present invention to provide a method and apparatus for receiving a signal, and to recover, from the received signal, a regenerated signal for the purposes of comparison or otherwise.

According to one aspect of the present invention, there is provided a method of regenerating a remotely transmitted signal comprising a symbol stream modulated onto a carrier in accordance with a predetermined standard, the method including the steps of:

a) receiving the remotely transmitted signal having known characteristics;
b) determining frame timing of the received signal;
c) identifying the locations of sequences within the signal from the frame timing;
d) identifying the structure of the sequences;
e) estimating phase shift values at the locations of the sequences;
f) demodulating the symbol stream using the estimated phase shift values and the structure of the sequences; and
g) remodulating the symbol stream using the phase shift values.

Advantageously, step f) comprises the additional step of correcting the symbol stream prior to step g). Various techniques may be used to effect the correction. Additionally, the step of correcting the symbol stream may incorporate substitution of symbols in the symbol stream where the symbol stream is known a priori.

Step f) may further comprise comparing demodulated symbols with known symbols to provide an estimate of the symbol error rate.

It is preferred that step a) includes down converting the received signal to a nominal 0 Hz intermediate frequency. Additionally, step a) further includes digitising the intermediate frequency signal to provide a digitised symbol stream in a complex signal domain.

Preferably, step e) includes estimating mean beat frequency of the signal, removing the estimated mean beat frequency from the signal and storing the mean beat frequency in a database. Additionally, step e) further includes estimating residual phase shift of the signal and storing the estimated residual phase shift of the signal in the database.

Ideally, the sequences include training sequences, synchronisation signals, frequency correction bursts, or dummy bursts. The training sequences may include eight training sequences associated with data bursts as well as a ninth training sequence associated with dummy bursts.

It is possible to use training sequences and correlation peaks for multi-path compensation. Channel estimation techniques using correlation processing of data sequences are preferably used to provide the multi-path compensation.

Regeneration of the signal is conveniently performed at zero beat frequency using digital signal processing techniques to achieve high performance and fidelity at low implementation cost. However, other techniques may be employed to achieve the desired result.

By providing for regeneration of a transmitted signal, it is possible to utilise a signal received from a remote source, even though the received signal may have been subjected to corruption over its propagation path. Therefore, preferably, the regenerated signal that is obtained is substantially identical to the transmitted signal, or one that would have been obtained from a transmitter, if a high quality connection (landline) had been used to propagate the signal to the receiver.

Most preferably regeneration of the received signal is achieved by a selective combination of: reconstructing portions of the received signal, by correcting the detected departure from the known form; and by other techniques for removing errors and reducing noise.

Apparatus may also be provided for regenerating a signal. Such apparatus may comprise elements that (i) enable a digital sample stream at nominal zero beat frequency in the complex signal domain to be produced from the received signal, (ii) determine a mean beat frequency shift in the nominal zero beat frequency signal, (iii) determine residual phase shifts over the span of the nominal zero frequency signal after the mean beat frequency shift has been removed, (iv) provide a mean beat frequency correction factor and residual phase shift correction parameters, (v) compare portions of the received signal with corresponding known signal forms, (vi) correct corrupted portions of the received signal to provide reconstructed signal portions, (vii) recombine the reconstructed signal portions with the mean beat frequency and residual phase shifts to provide a regenerated signal at the nominal zero beat frequency.

Periodic timing information may then be extracted and used in conjunction with phase shift measurements to provide an estimate of the relative mean beat frequency offset and residual "noise-like" phase shifts between the received signal and a stable local oscillator. Ideally, phase information is used to provide the mean beat frequency and residual phase shift correction parameters.

Once any mean beat frequency and residual noise-like phase shifts and have been corrected, demodulation of the signal bit-stream can be performed to provide a stream of demodulated symbols in which various techniques may be applied to correct symbol errors. Some preferred techniques are described below.

Typically, for GSM systems, the received signal is in the region of 900 MHz to 1800 MHz and is mixed to an intermediate frequency prior to Nyquist filtering and digitising to produce symbol streams at nominal zero beat frequency in the complex signal domain. Other embodiments may be employed to achieve equivalent results.

Using the method of the present invention described generally above, a signal is obtained which is typically as near a replica of the transmitted signal at nominal zero beat frequency as is possible to achieve, without using a hard wire connection from the original source of the transmitted signal. Thus a regenerated nominal zero beat frequency signal is obtained which may be stored and, for example, against which comparisons may be subsequently made.

In the simplest embodiment of demodulation of the beat frequency and phase-corrected version of the nominal zero beat frequency signal, demodulated data (symbols), derived from the received signals, are hard limited. This has the effect of removing most of the interference that may be present, provided that the wanted signal is significantly larger than the interference, which is usually the case for the applications of interest. Other more sophisticated demodulation techniques may also be applied.

The appropriate modulation is then applied to demodulated symbols and the previously measured mean beat frequency and residual phase shift correction parameters are applied to create a regenerated signal at the nominal zero beat frequency, uncorrupted by multipath reflections, interference or by other effects due to "over the air" propagation.

More sophisticated decoding, e.g. Viterbi decoding, may be applied (for example, in data bursts) for recovering some data sequences. Other data symbol sequences are reconstructed using prior knowledge of the structure of the signal (for example synchronisation sequences and bursts previously identified by the signal processing functions as GSM dummy bursts).

Use of a priori knowledge of a signal structure can also be used to provide an estimate of the Bit Error Rate (BER) from the number of data corrections that are needed in order to reconstruct a signal. The portions of the signal that can be reconstructed using a priori knowledge include, for example, for GSM, a training sequence, a synchronisation (sync) signal, a so-called dummy signal or Frequency Correction Bursts (FCBs). Such a priori knowledge may be obtained from databases or look-up tables of characteristics of the signals that are published as standards.

Other signal degradations may also need to be corrected or compensated for when regenerating the transmitted signal. One such signal degradation is called multi-path dispersion. Multi-path dispersion occurs as a result of reflections from buildings, trees, moving objects and other geographical features. For example, a training signal sequence may occur in the middle of each data burst in order to provide a means of estimating the multi-path dispersion characteristics. Once computed, the estimate may be used to correct for such multi-path dispersions.

Active data bursts may contain data relating to call handling/routing instructions, phone operator commands, data relating to base station control and user information, as well as payload data per se.

Conventional GSM receivers decode information from a carrier signal to establish which bursts contain data relevant to them, and which of the possible set of training sequences is currently in use to characterise those bursts. Bursts containing no data are filled with a 'dummy' code and are not subsequently processed by conventional receivers. It has been realised that by utilising all data bursts, including dummy signals, that it is possible to regenerate a high quality reference signal which is a very close replica of what was transmitted, because the vast majority of the received signal can be processed to estimate the mean beat frequency and residual phase shifts on a burst-by-burst basis. For occasional bursts where this is not possible or convenient (for example the Frequency Correction Bursts), simple interpolation is conveniently applied.

Information derived from training sequences enables the structure of a received signal to be deduced; and relevant correction factors to be generated. Comparison with known signal structures is made and substitution of corrupted data effected by using correct data derived from, for example, look-up tables.

In a typical GSM system there are eight different training signal sequences which may be used in live data bursts to distinguish signals from various base stations and minimise interference due to frequency re-use.

The amount of GSM data traffic varies, particularly from low use to peak periods. During low use periods base stations are relatively inactive and transmit so called dummy bursts of data. These signals are used, in a preferred embodiment of the present invention, in order to obtain phase and frequency information in the same way as active data bursts, by treating the centre of the dummy burst effectively as an additional training sequence. Thus dummy bursts, containing no data, may be considered as containing a ninth training sequence.

Preferably the apparatus may be adapted to use a central portion of a dummy burst as a datum for correlation and phase noise measurement.

Thus use of the information enables the phase and frequency of an incoming signal, relative to the receiver oscillator, to be obtained, operating in the complex signal domain at the nominal zero beat frequency of the receiver. The measured phase variation between oscillators, transmitting and receiving the signals, can then be obtained. This information may be analysed and can be used to express the phase variation conveniently as a mean beat frequency and residual "noise-like" phase shift over the signal span of interest. Both mean beat frequency and any residual phase shifts are derived from the output of the burst detection and correlation process.

Ideally for received GSM bursts, a correlation test is performed using all training sequences including the appropriate portion of the dummy burst. The signal giving the largest magnitude is usually then selected. This enables the burst type to be uniquely identified (for example, dummy or data burst and the appropriate training sequence in use for the latter). The phase of the data burst relative to the receiver oscillator can then be derived from 'in phase' (I) and 'phase quadrature' (Q) outputs of the complex signal domain correlator.

Dedicated synchronisation ('sync') sequences are initially used to establish frame timing data. Frame timing and other necessary signal structure information can then be established.

Ideally periodic timing information includes frame timing information. In GSM systems, initial frame and burst timing is advantageously obtained by a correlation search for a pattern of main synchronisation burst. Phase and frequency offset information is then obtained by correlating, preferably, for example by using a central section of a selected GSM signal or data burst, with stored versions of permitted modulation patterns for those signals or data bursts. Comparison may be made with stored values held in a database or look-up table.

Preferably frame timing of signals is obtained by using a correlator. The correlator identifies GSM synchronisation sequences from a received signal. Typically, the main GSM synchronisation or 'sync' sequence is 64 symbols in length.

A computer, dedicated Digital Signal Processing (DSP) chip, Field Programmable Gate Array (FPGA) or Application Specific Integrated Circuit (ASIC) is ideally used in order to perform the aforementioned tasks. An advantage of digital techniques is that higher fidelity signal processing can be achieved in comparison with analogue methods.

In order to further enhance signal reconstruction a measurement of phase shift is made on received signals. This is used to improve the signal reconstruction process by allowing for any frequency offset and phase shift that may have occurred. A compensation factor for any frequency error and phase shift may then be computed. The compensation factor is used to compensate for the following errors, which are conveniently defined as follows:

(i) a mean beat frequency (which is the mean frequency difference between transmitted and received oscillators over a predetermined period, measured with respect to the nominal zero beat frequency of the receiver); and (ii) any residual "noise-like" phase shifts (that are due to relative short term signal frequency fluctuations over a predetermined period) between transmitted and received oscillators.

Errors are removed as signals are generated as and when the need arises, so that a complete signal can subsequently be reconstructed. An erasable dynamic memory or cache can be used for this purpose.

Regeneration of the reference signal can then take place, ideally in the digital domain, for example under control of a microprocessor. Signal regeneration relies upon the fact that some portions of the signal have been measured directly, reconstructed and estimated. The regeneration apparatus therefore effectively comprises: a signal processor and associated memory operating under the direction of software, programmed to perform assigned or specific functions, each of which is described in greater detail below.

For a better understanding of the present invention, reference will now be made, by way of example only, to the accompanying drawings in which:—

FIG. 3 is a table of results from a trial using the system of FIG. 2; and

Figure 1:
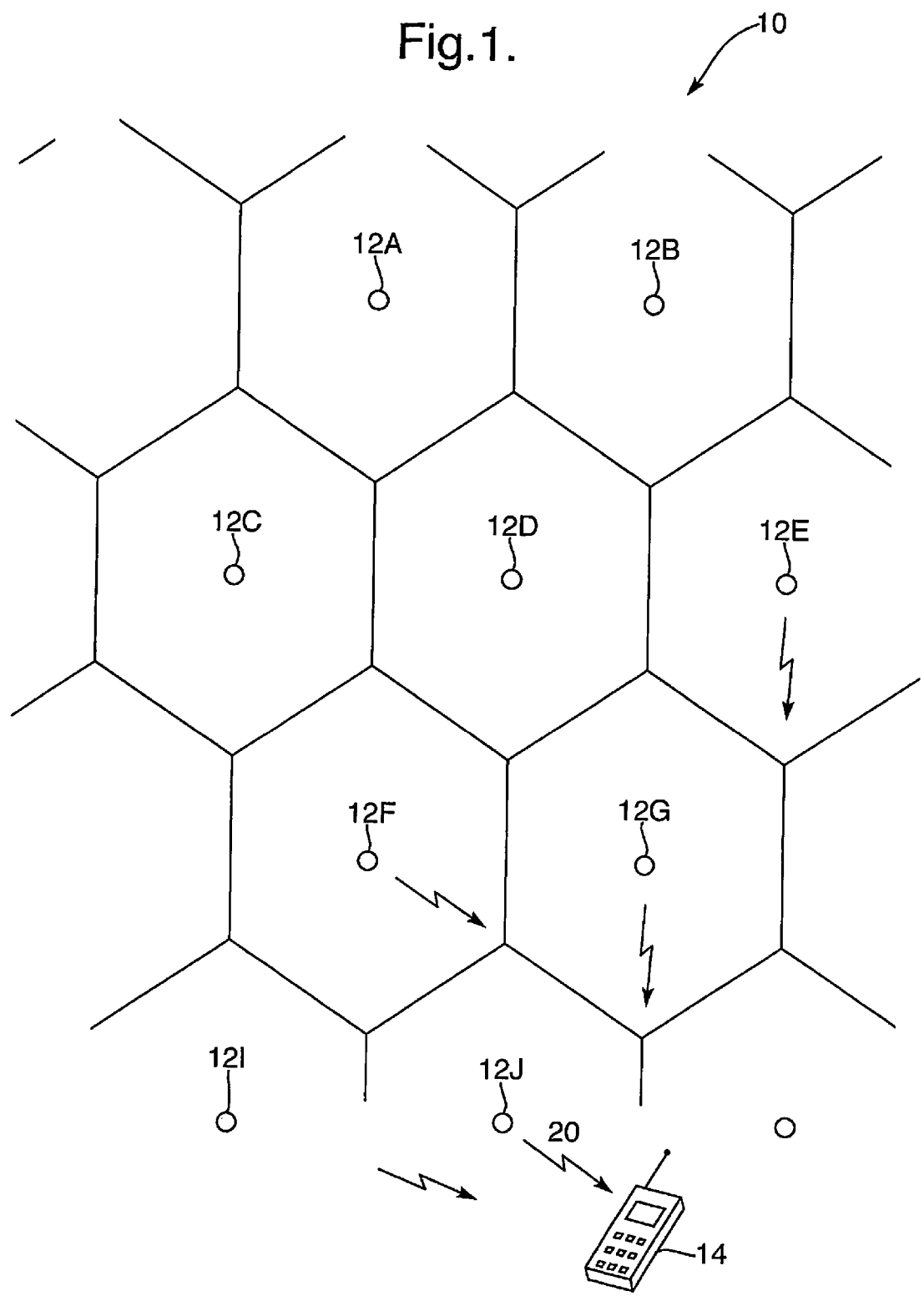
FIG. 1 is a diagrammatic representation of a cellular communication system.

Referring initially to FIG. 1, there is shown in diagrammatic form, a network-10 with base stations 12A to 12J, in a cellular communication system. A receiver, such as a mobile handset 14, receives signals from several base stations 12E, 12F, 12G, 12I and 12J. Received signals generally are superimposed with noise; may include errors and are often accompanied by unwanted (spurious) signals. The received signal may be converted to a zero beat or to an intermediate frequency (IF) signal, filtered, digitised and processed in terms of in-phase (I) and quadrature (O) sample streams. Other techniques may be used.

Where appropriate interference may be reduced by focussing the antenna of the mobile handset 14 on a desired basestation to utilise any directive gain characteristics. Although this serves to reduce interference and multi-path fading effects further interference and multi-path reduction techniques are required to improve the ultimate quality of the received signal.

Signal 20 (FIG. 1) is received from base station 12J by mobile handset or other suitable receiver 14 and is of the type found in a GSM cellular communications system. The received signal 20 so obtained is generally corrupted by multi-path dispersion and interference effects, for example, from other base stations. In order to obtain a high quality version of the signal that was originally transmitted, regeneration of the transmitted signal from what the received signal is necessary. This will now be explained in greater detail below, with reference to FIG. 2.

The received signal is down converted and processed to provide separate, digitised I and Q sample streams at zero beat frequency. The I and Q sample streams form a complex signal 100 (FIG. 2) that is subsequently processed in a signal regeneration system in accordance with the present invention.

The mean beat frequency and residual "noise-like" phase shifts and arise as a consequence of a frequency mismatch and drift between stable oscillators in the receiver and the transmitter, and represent a convenient approach to representing, measuring and processing such frequency mismatches and drifts.

Figure 2:
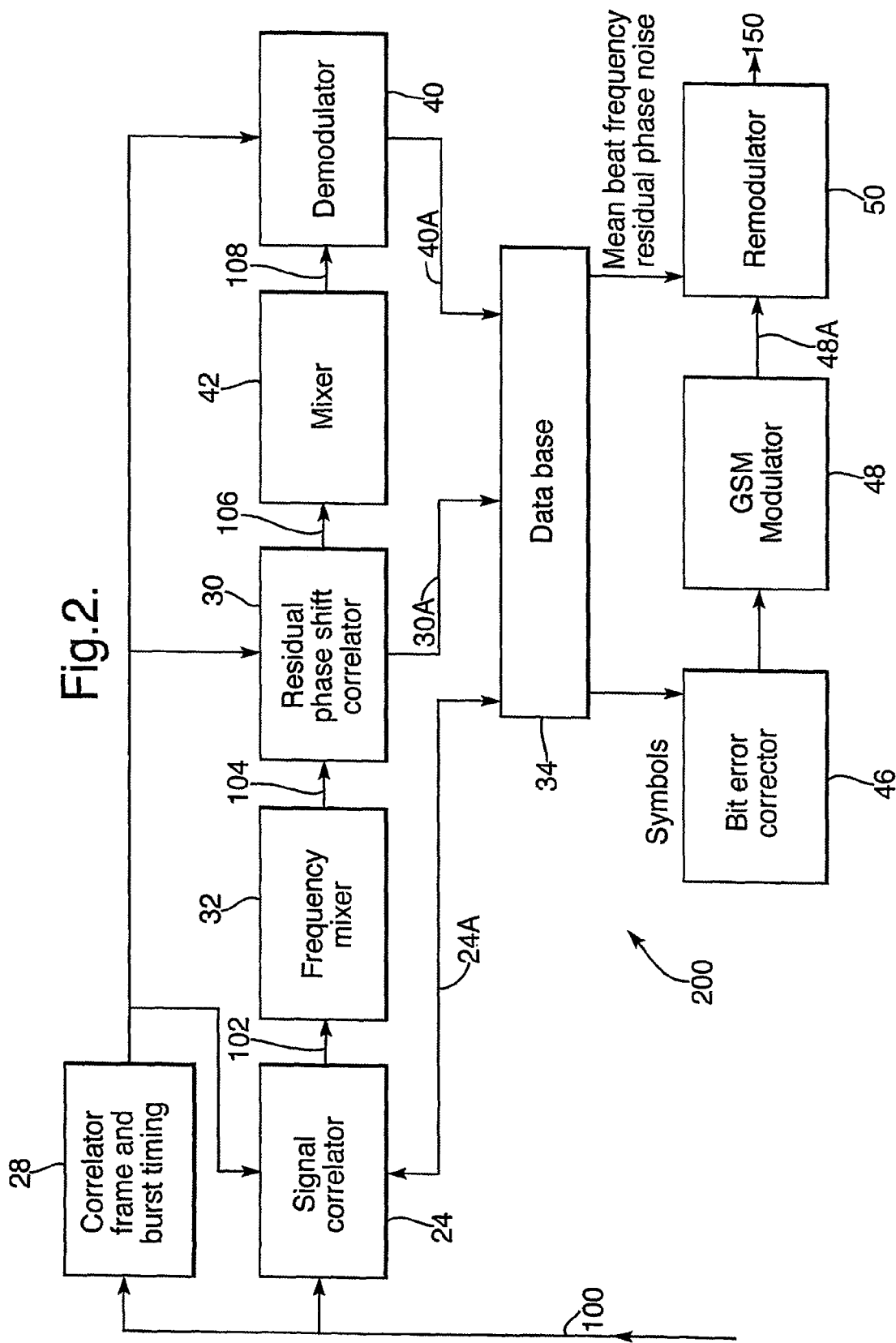
FIG. 2 is a block diagram illustrating a signal regeneration system in accordance with the present invention.

Referring now to FIG. 2, a signal regeneration system 200 is shown which comprises a signal correlator 24, a frame and burst timing correlator 28, a residual phase shift correlator 30, a frequency mixer 32, a database (or look-up table) 34, a demodulator 40, a mixer 42, a bit error corrector 46, a GSM modulator 48 and a remodulator 50. The components of the regeneration system 200 are connected as shown.

The complex signal 100 is input, in parallel, to the signal correlator 24 and the frame a burst timing correlator 28. The frame and burst timing corellator 28 detects where GSM signal frames start and end in the signal 100 as well as the positions of training sequences and other components of the signal structure. This signal timing information is supplied to the correlator 24; the residual phase shift correlator 30 and the demodulator 40.

The signal correlator 24 uses the GSM training sequence in each burst to estimate the mean beat frequency by estimating the mean change in phase shift between successive bursts over the signal span of interest. The estimate 24A of the mean beat frequency is supplied to database 34. Output signal 102 is also passed to frequency mixer 32 from the signal correlator 24.

Frequency mixer 32 eliminates the beat frequency 24A from output signal 102 and provides an input signal 104 for the residual phase shift correlator 30.

The residual phase shift correlator 30 estimates residual "noise-like" phase shift characteristics present on signal 104 and provides an estimate 30A of the residual phase shift (one measurement for each GSM burst) for the database 34. Signal 106 is also provided for mixer 42.

Mixer 42 removes the estimate 30A of the residual phase shift and the resulting signal 108 is passed to the demodulator 40 which demodulates the signal 108. Demodulated data symbols 40A are sent to database 34.

Demodulator 40 may use a number of techniques which may include the following: hard decision, which has the effect of suppressing interference; and/or error correction techniques (eg Viterbi correction).

It will be understood that the particular type of demodulation technique or error correction applied will depend on the implementation as well as the content and structure of the signal.

Signals 24A, 30A and 40A sent to the database 34 are subsequently reassembled to a regenerated reference signal as explained below.

Pre-defined symbol sequences within the GSM protocol permit error detection and correction of known sections of the demodulated symbol stream. Such sequences that may be required in the present invention are stored in database or on look-up table 34. These sequences are used to measure symbol errors rate and correct erroneous data symbols in signal 24A. Reconstruction of the transmitted signal is then performed using the corrected symbol stream in conjunction with the frequency and phase information contained in 24A and 30A.

Database 34 supplies symbols to the error corrector 46 and information relating to the beat frequency and residual phase shifts to the remodulator 50 respectively. The bit error corrector 46, GSM modulator 48 and the remodulator 50 enable and control access to the database 34 so that bit errors can be detected and corrected; the corrected data symbol stream can be modulated; and the residual phase shifts and the mean beat frequency estimates can be reapplied so as to provide a zero beat frequency version of the GSM signal as originally transmitted.

Reapplication of the mean beat frequency and residual phase shifts is essential in order to obtain an accurate approximation to the originally transmitted signal 20 converted to zero beat frequency, with respect to the stable local oscillator in the receiver. Consequently, as near an approximation to the original signal 20 is therefore obtained.

A bit corrector 46 accesses the signal database 34 and downloads stored data. In certain known portions of the GSM signal corrupted symbols are replaced with defined symbols held in look-up tables in the memory of the database 34. A comparison of known portions of the received signal (for example, sync sequences and dummy bursts) in the database with signals from a look-up enables an estimate of the symbol error rate in the received signal to be made. The resultant bit-stream is then effectively a best estimate of the symbols that were originally transmitted.

The best estimate of transmitted data symbol stream is fed to GSM modulator 48 to create a modulated corrected signal 48A, which is then passed to a remodulator 50. Remodulator 50 accesses the database 34 and re-applies the residual phase shift 24A and mean beat frequency estimate 30A. The regenerated GSM reference signal is then output from the remodulator 50 as signal 150.

By remodulating the demodulated GSM signals and re-applying the mean beat frequency and residual phase shift corrections, a high quality regenerated replica of the signal from the transmitter referred to the nominal zero beat frequency of the receiver.

It will be appreciated that, if the structure of the signal is known a priori, it a simple substitution of the relevant element for correction can be implemented from the database or look-up table 34. Alternatively, the correction is effected during subsequent processing.

Accordingly, therefore in summary, a signal regenerator receives a corrupted signal, uses a set of known signal sequences (eg sync and training sequences) to determine the signal timing and to correlate the signal. The mean beat frequency is estimated, mixed out and stored in a database. The residual phase shifts are then estimated and stored in a database. A symbol stream is derived by suitable demodulation techniques and the symbol stream is stored in a database. Stored information is extracted from the database to measure and correct symbol errors GSM modulate the corrected symbol stream and remodulate the residual phase shifts and mean beat frequency.

The invention therefore reduces and ideally removes signal corruptions arising form effects such as multi-path dispersion, interference and noise.

The method described above with reference to FIG. 2 is carried out on each burst within the signal to be regenerated so that data is obtained for each burst. FIG. 3 illustrates a portion of a table of data obtained from a trial using the signal regeneration system shown in FIG. 2 (for burst numbers 293 to 348). The data indicates, for each burst within the signal, the burst number, the burst offset in the storage database, a flag field used for internal control purposes, the training sequence identifier (8="dummy"), the initially measured burst phase and the residual phase shift after mean beat frequency correction.

Figure 4:
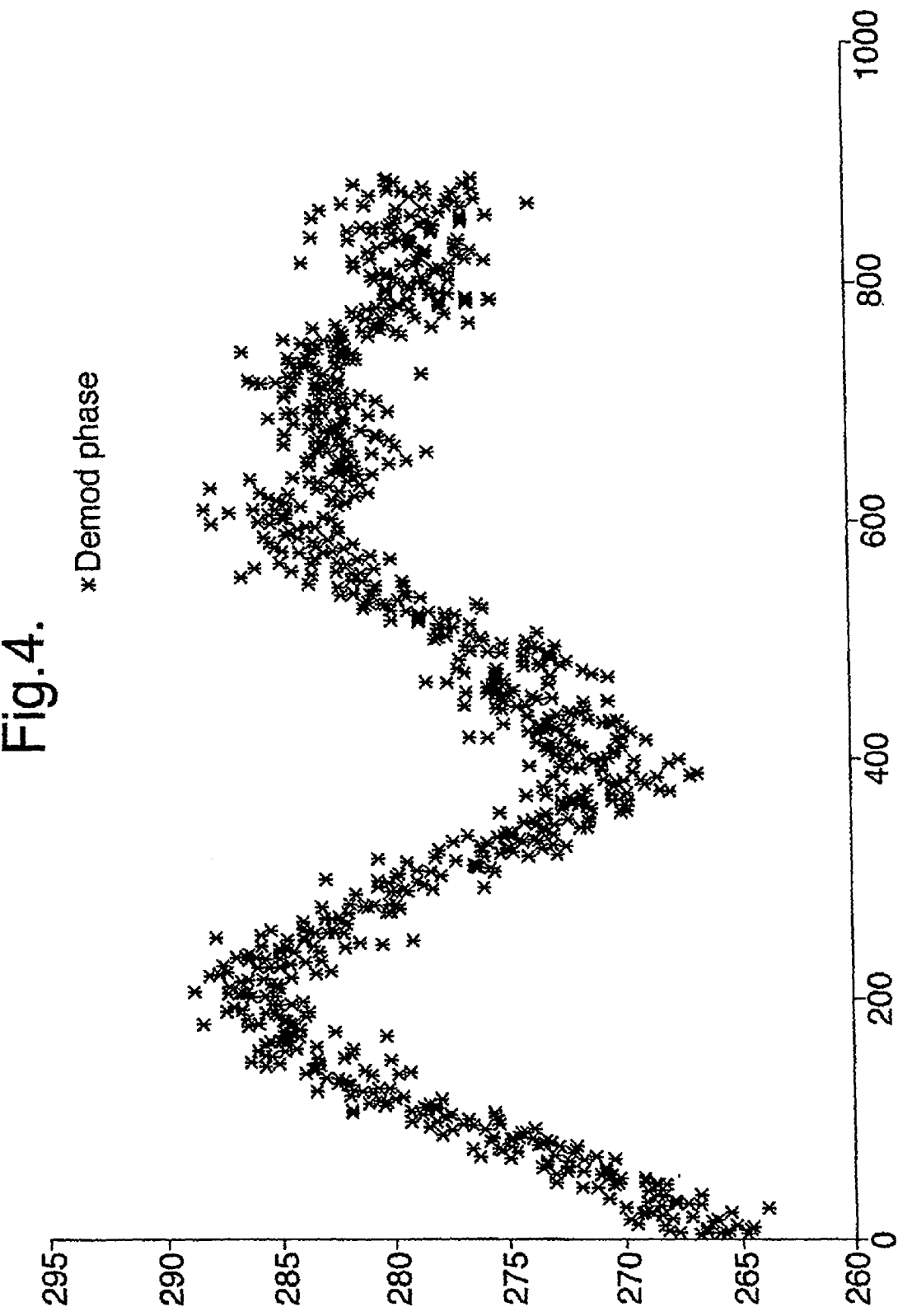
FIG. 4 is a graph of the residual phase shift measurement against burst number within a signal.

FIG. 4 shows a composite phase shift versus burst count graph constructed from the table shown in FIG. 3. Each point on the graph corresponds to the residual phase shift measurement from one burst.

It will be appreciated that variation may be made to the preferred embodiment without departing from the scope of the invention.

The invention claimed is:

1. A method of regenerating a remotely transmitted signal comprising a symbol stream modulated onto a carrier in accordance with a predetermined standard, the method including the steps of:
   a) receiving the remotely transmitted signal having known characteristics;
   b) determining frame timing of the received signal;
   c) identifying the locations of one or more training sequences within the signal from the frame timing, the one or more training sequences including eight training sequences associated with data bursts and a ninth training sequence associated with dummy bursts containing no data;
   d) identifying the structure of the training sequences;
   e) estimating phase shift values at the locations of the sequences;
   f) demodulating the symbol stream using the structure of the sequences;

g) detecting corrupted symbols in the symbol stream where prior knowledge of the symbol stream exists and correcting the symbol stream by substituting correct symbols for the corrupted symbols in the symbol stream; and h) remodulating the symbol stream using the phase shift values, wherein the training sequences include synchronization signals and frequency correction bursts.

2. The method according to claim 1, further including the step of using training sequences and correlation peaks for multi-path compensation.

3. The method according to claim 2, further including the step of using channel estimation of data sequences for multi-path compensation.

4. A method of regenerating a remotely transmitted signal comprising a symbol stream modulated onto a carrier in accordance with a predetermined standard, the method including the steps of:

a) receiving the remotely transmitted signal having known characteristics;

b) determining frame timing of the received signal;

c) identifying the locations of sequences within the signal from the frame timing;

d) identifying the structure of the sequences;

e) estimating phase shift values and mean beat frequency at the locations of the sequences;

f) demodulating the symbol stream using the structure of the sequences;

g) detecting corrupted symbols in the symbol stream where prior knowledge of the symbol stream exists and correcting the symbol stream by substituting correct symbols for the corrupted symbols in the symbol stream; and h) remodulating the symbol stream using the phase shift values and the mean beat frequency, wherein the sequences include one or more training sequences, synchronization signals, frequency correction bursts and dummy bursts containing no data and the training sequences include eight training sequences associated with data bursts and a ninth training sequence associated with dummy bursts containing no data.

5. The method according to claim 4, wherein step f) further comprises comparing demodulated symbols with known symbols to provide an estimate of the symbol error rate.

6. The method according to claim 5, wherein step a) includes down converting the received signal to a nominal 0 Hz intermediate frequency.

7. The method according to claim 6, wherein step a) further includes digitizing the intermediate frequency signal to provide a digitized symbol stream in a complex signal domain.

8. The method according to claim 7, wherein step e) includes, removing the estimated mean beat frequency from the signal and storing the mean beat frequency in a database.

9. The method according to claim 8, wherein step e) further includes estimating residual phase shift of the signal and storing the estimated residual phase shift of the signal in the database.

10. The method according to claim 4, further including the step of using training sequences and correlation peaks for multi-path compensation.

11. The method according to claim 10, wherein channel estimation of data sequences are used for multi-path compensation.

12. The method according to claim 11, wherein step a) includes down converting the received signal to a nominal 0 Hz intermediate frequency.

13. The method according to claim 12, wherein step a) further includes digitizing the intermediate frequency signal to provide a digitized symbol stream in a complex signal domain.

14. The method according to claim 4, wherein step f) further comprises comparing demodulated symbols with known symbols to provide an estimate of the symbol error rate.

15. The method according to claim 4, wherein step f) further comprises comparing demodulated symbols with known symbols to provide an estimate of the symbol error rate.

16. The method according to claim 15, wherein step a) includes down converting the received signal to a nominal 0 Hz intermediate frequency.

17. The method according to claim 16, wherein step a) further includes digitizing the intermediate frequency signal to provide a digitized symbol stream in a complex signal domain.

18. A method of regenerating a remotely transmitted signal comprising a symbol stream modulated onto a carrier in accordance with a predetermined standard, the method including the steps of:

a) receiving the remotely transmitted signal having known characteristics;

b) determining frame timing of the received signal;

c) identifying the locations of sequences within the signal from the frame timing;

d) identifying the structure of the sequences;

e) estimating phase shift values and mean beat frequency at the locations of the sequences;

f) demodulating the symbol stream using the structure of the sequences;

g) detecting corrupted symbols in the symbol stream where prior knowledge of the symbol stream exists and correcting the symbol stream by substituting correct symbols for the corrupted symbols in the symbol stream;

h) remodulating the symbol stream using the phase shift values and the mean beat frequency; and i) using training sequences and correlation peaks for multi-path compensation, wherein the sequences include one or more training sequences, synchronization signals, frequency correction bursts and dummy bursts containing no data and the training sequences include eight training sequences associated with data bursts and a ninth training sequence associated with dummy bursts containing no data.

19. The method according to claim 18, wherein channel estimation of data sequences are used for multi-path compensation.

* * * * *